(12) United States Patent
Nagao

(10) Patent No.: US 10,755,109 B2
(45) Date of Patent: Aug. 25, 2020

(54) MONITORING SYSTEM, MONITORING METHOD, AND NON-TRANSITORY COMPUTER-READABLE STORAGE MEDIUM

(71) Applicant: CANON KABUSHIKI KAISHA, Tokyo (JP)

(72) Inventor: Yoshitaka Nagao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/360,574

(22) Filed: Mar. 21, 2019

(65) Prior Publication Data

US 2019/0303685 A1     Oct. 3, 2019

(30) Foreign Application Priority Data

Mar. 28, 2018    (JP) ................................ 2018-062266

(51) Int. Cl.
*G06K 9/00*      (2006.01)
*H04N 5/232*      (2006.01)
(Continued)

(52) U.S. Cl.
CPC ..... *G06K 9/00778* (2013.01); *G06K 9/00369* (2013.01); *G06K 9/00637* (2013.01);
(Continued)

(58) Field of Classification Search
CPC ........... G06K 9/00778; G06K 9/00369; G06K 9/00637; G06K 9/2054; G06K 2209/21;
(Continued)

(56) References Cited

U.S. PATENT DOCUMENTS 7,903,141 B1    3/2011   Mariano et al.
2006/0067456 A1   3/2006   Ku et al.
(Continued)

FOREIGN PATENT DOCUMENTS

CN    101727573 A    6/2010
CN    103297672 A    9/2013
(Continued)

OTHER PUBLICATIONS

Extended European Search Report issued by the European Patent Office in corresponding European Patent Application No. 19162735.5 dated Aug. 22, 2019.
(Continued)

*Primary Examiner* — John R Schnurr
(74) *Attorney, Agent, or Firm* — Carter, DeLuca & Farrell LLP

(57) ABSTRACT

A monitoring system comprising an imaging unit installed in a position from which a plurality of structures can be imaged and which is higher than at least some of the plurality of structures, and configured to generate an image by imaging a monitoring area including the plurality of structures and a ground adjacent to the plurality of structures, a setting unit configured to set a plurality of detection target regions, wherein the detection target region includes at least a region of the ground in the image, and excludes at least a region which is included in a region corresponding to the structure and is not in contact with the region of the ground in the image; and a processing unit configured to count persons in each detection target region in the image.

21 Claims, 9 Drawing Sheets

(51) Int. Cl.
*G06K 9/20* (2006.01)
*H04N 5/262* (2006.01)
*H04N 7/18* (2006.01)
*G08B 13/196* (2006.01)

(52) U.S. Cl.
CPC ......... *G06K 9/2054* (2013.01); *G08B 13/196* (2013.01); *H04N 5/23296* (2013.01); *H04N 5/23299* (2018.08); *H04N 5/2621* (2013.01); *H04N 7/183* (2013.01); *G06K 2209/21* (2013.01)

(58) Field of Classification Search
CPC ............. G08B 13/196; H04N 5/23299; H04N 5/23296; H04N 5/2621; H04N 7/183
See application file for complete search history.

(56) References Cited

U.S. PATENT DOCUMENTS

| | | | | |
|---|---|---|---|---|
| 2014/0072170 A1* | 3/2014 | Zhang | ................ | G06K 9/00369 382/103 |
| 2014/0149094 A1* | 5/2014 | Takeuchi | ........... | G06K 9/00778 703/6 |
| 2016/0379049 A1* | 12/2016 | Yu | ........................ | G06T 7/194 382/103 |
| 2017/0053172 A1* | 2/2017 | Nakasu | .............. | G06K 9/00778 |
| 2017/0289526 A1* | 10/2017 | Sasatani | ............... | H04N 13/302 |
| 2018/0039860 A1* | 2/2018 | Nakasu | .................... | G06T 7/254 |
| 2019/0205659 A1* | 7/2019 | Cuban | ................ | G06K 9/00718 |
| 2019/0251367 A1* | 8/2019 | Ida | ..................... | G01C 21/3461 |
| 2019/0266415 A1* | 8/2019 | Oami | ...................... | G06T 7/248 |

FOREIGN PATENT DOCUMENTS

| | | |
|---|---|---|
| CN | 103676829 A | 3/2014 |
| CN | 106454228 A | 2/2017 |
| JP | H0535993 A | 2/1993 |
| JP | 2004104274 A | 4/2004 |
| JP | 2007201556 A | 8/2007 |
| JP | 2017152964 A | 8/2017 |
| JP | 2017219996 A | 12/2017 |
| WO | 2008139203 A2 | 11/2008 |

OTHER PUBLICATIONS

Notification of the First Office Action issued by the State Intellectual Property Office of P. R. China dated Jun. 28, 2020 in corresponding CN Patent Application No. 201910235207.X, with English translation.

* cited by examiner

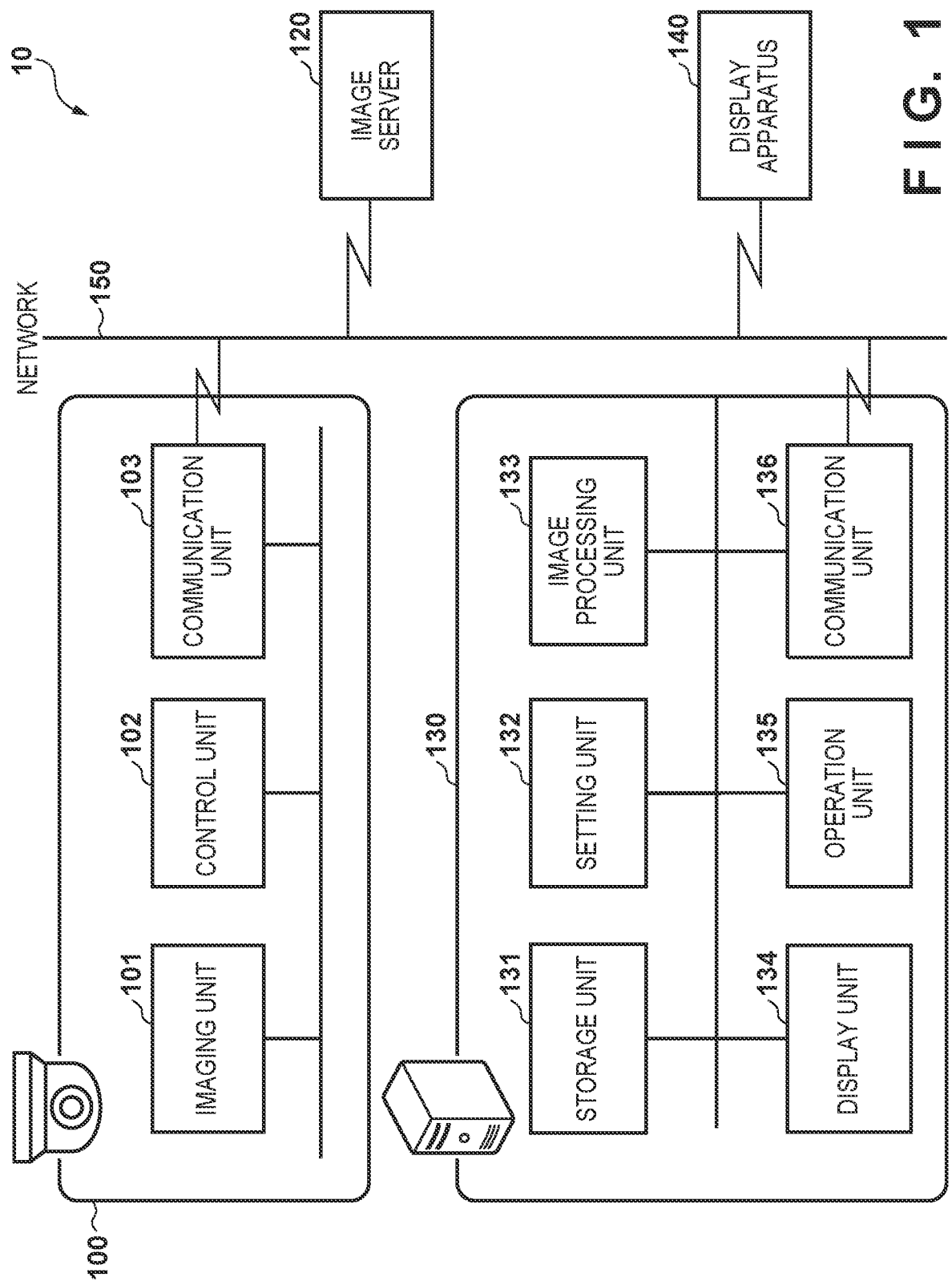

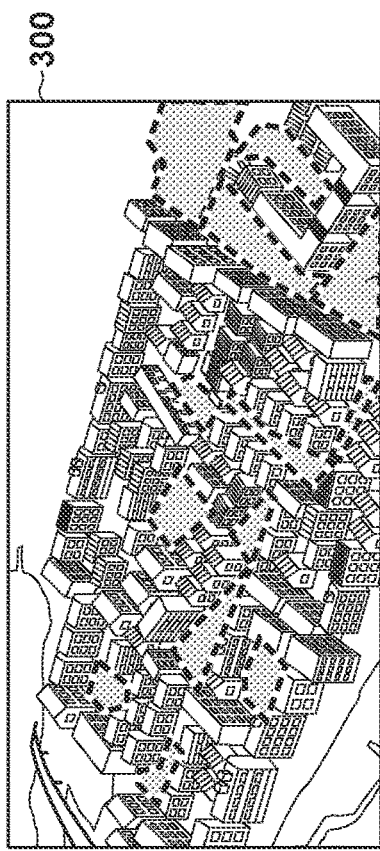
F I G. 3B
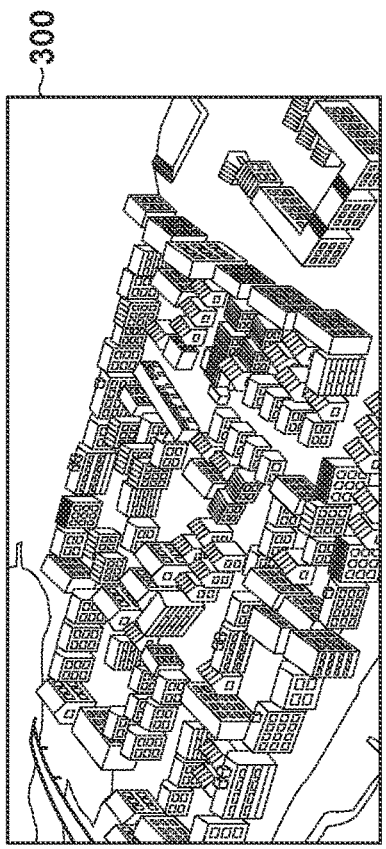
F I G. 3A
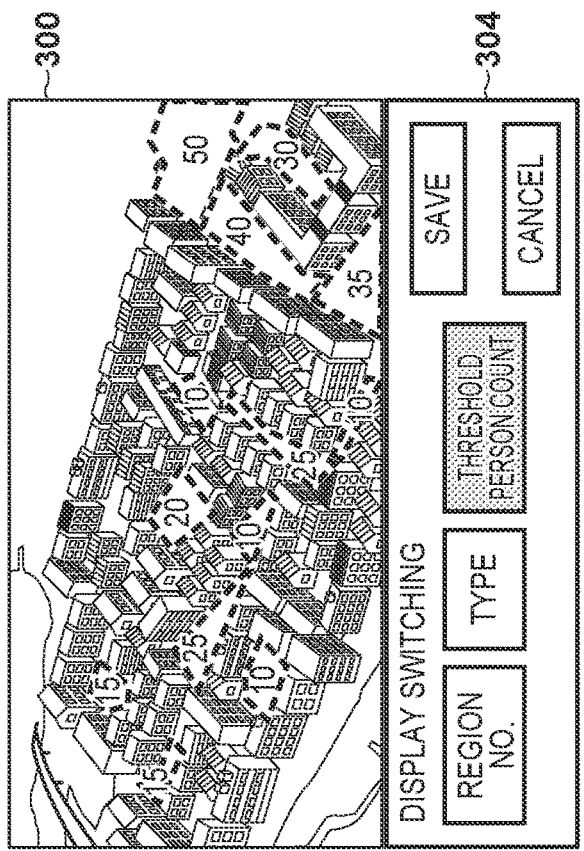
F I G. 3D
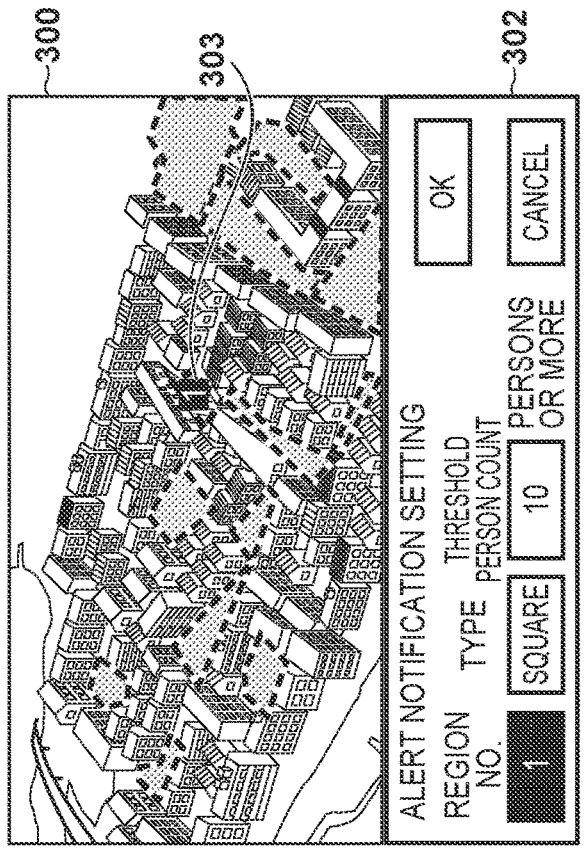
F I G. 3C

MONITORING SYSTEM, MONITORING METHOD, AND NON-TRANSITORY COMPUTER-READABLE STORAGE MEDIUM

BACKGROUND OF THE INVENTION

Field of the Invention

The present disclosure relates to a monitoring system, a monitoring method, and a non-transitory computer-readable storage medium.

Description of the Related Art

In urban area monitoring, a plurality of cameras are installed in different places of the urban area, and an observer performs monitoring by switching monitoring images of the plurality of cameras or displaying many small screens on a monitor, in order to monitor streets and squares. However, monitoring performed by visual observation by the observer often causes overlooking, and this makes it difficult to maintain a high monitoring accuracy. Therefore, a technique which performs monitoring by analyzing camera images has been proposed.

According to a technique proposed by Japanese Patent Laid-Open No. 2004-104274, an abnormality detection process is performed by using an abnormality detection algorithm such as pattern matching with existing video data, with respect to an object, a size, a moving velocity, a moving acceleration, an operation pattern, and other states contained in image information. As a result of this process, it is possible to select an image to be displayed in a second monitoring view from monitoring views simultaneously displaying a plurality of images.

Also, according to a technique proposed by Japanese Patent Laid-Open No. 5-35993, a moving amount is detected from the same monitoring camera output, and, if it is determined that the detected moving amount does not exceed a predetermined value, this monitoring camera can be excluded from the order of switching of a plurality of monitoring cameras.

In the above-mentioned proposed techniques, however, it is necessary to prepare a plurality of cameras having specific viewing angles, and analyze the image of each camera. To monitor a wide area such as an urban area, therefore, it is necessary to prepare a large number of cameras, and use a high arithmetic performance capable of individually processing images captured by these cameras. In particular, a viewing angle for a normal monitoring purpose makes it difficult to detect the number of objects in a relatively broad target area.

SUMMARY OF THE INVENTION

Accordingly, a technique which efficiently detects the number of objects in a relatively wide target area will be provided.

One aspect of embodiments relates to a monitoring system comprising an imaging unit installed in a position from which a plurality of structures can be imaged and which is higher than at least some of the plurality of structures, and configured to generate an image by imaging a monitoring area including the plurality of structures and a ground adjacent to the plurality of structures, a setting unit configured to set a plurality of detection target regions, wherein the detection target region includes at least a region of the ground in the image, and excludes at least a region which is included in a region corresponding to the structure and is not in contact with the region of the ground in the image, and a processing unit configured to count persons in each detection target region in the image.

Further features of the invention will become apparent from the following description of exemplary embodiments (with reference to the attached drawings).

BRIEF DESCRIPTION OF THE DRAWINGS

FIG. 1 is a view showing a configuration example of a monitoring system 10 corresponding to an exemplary embodiment;

FIG. 3A is a view showing an example of an image obtained by imaging an urban area corresponding to the exemplary embodiment;

FIG. 3B is a view showing a display example of a detection target region corresponding to the exemplary embodiment;

FIG. 3C is a view showing a display example of a setting screen corresponding to the exemplary embodiment;

FIG. 3D is a view showing another display example of the setting screen corresponding to the exemplary embodiment;

DESCRIPTION OF THE EMBODIMENTS

Figure 2A:
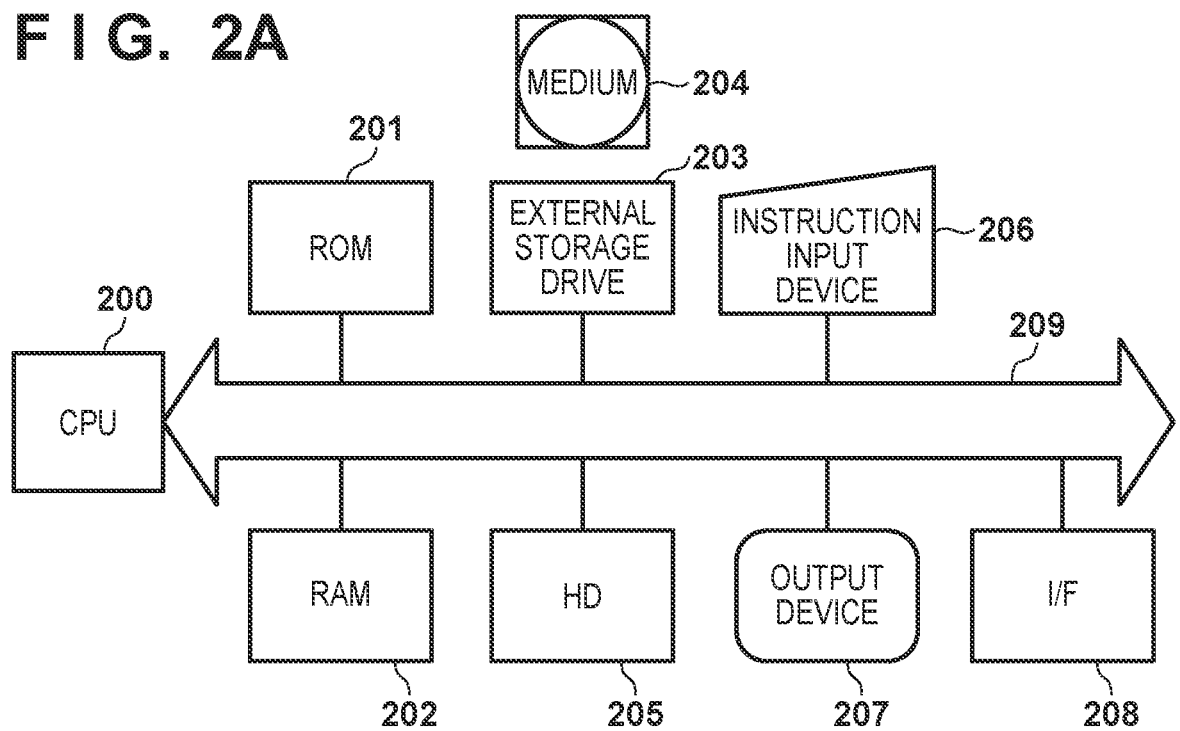
FIG. 2A is a view showing a hardware configuration example of an information processing apparatus 130 corresponding to the exemplary embodiment.

Exemplary embodiments will be explained in detail below based on the accompanying drawings. Note that configurations to be disclosed in the following embodiments are merely examples, so the embodiments are not limited to the configurations shown in the drawings. In the explanation of the following embodiments, cases in which monitoring systems according to the exemplary embodiments are used in person monitoring in an urban area will be explained. However, the target to which the monitoring systems are applied is not limited to an urban area, and the monitoring systems are applicable to a wide-area monitoring target.

First Embodiment

FIG. 1 is a view sowing a configuration example of a monitoring system 10 according to the first embodiment. Referring to FIG. 1, the monitoring system 10 is obtained by interconnecting an imaging apparatus 100, an image server 120, an information processing apparatus 130, and a display apparatus 140 across a network 150. The constituent elements of the monitoring system 10 shown in FIG. 1 are merely examples, and other constituent elements may also be added. The individual constituent elements will be explained below.

The imaging apparatus 100 can include an imaging unit 101, a control unit 102, and a communication unit 103. The imaging unit 101 can include an optical system, an imaging sensor, a developing unit, an encoding unit, and the like. The optical system adjusts the magnification, focusing position, or light amount of an object arriving at the imaging sensor. The optical system includes a predetermined driving mechanism such as a motor for moving a lens, and the operation of the driving mechanism is controlled in accordance with instructions from the control unit 102. The imaging sensor can include an A/D converter so as to convert an analog image signal obtained by photoelectrically converting a light image formed on the imaging plane into a digital image signal, and output the digital image signal. The developing unit can perform developing processes such as a DeBayer process, a white balancing process, and a gradation converting process, on the digital image signal output from the imaging sensor. The encoding unit generates image data by compressing and encoding the digital image signal output from the developing unit. The image compression method can be based on the standard such as H264, H.265, MJPEG, or JPEG. It is also possible to generate image data having an arbitrary form including mp4 or avi.

The imaging unit 101 can obtain a 30-fps moving image (live image) by obtaining images of 30 frames per second. In the following explanation, "a live image" or "image data" means digital image data generated by the imaging unit 101.

The control unit 102 adjusts the imaging conditions such as the viewing angle and imaging direction of the imaging apparatus 100, the frame rate, and the type of image to be obtained. This adjustment of the imaging conditions can be executed in accordance with instructions from the user, and can also be executed in accordance with set values prestored in the imaging apparatus 100. The user can input instructions from the information processing apparatus 130 or the display apparatus 140 across the network 150, or directly from a console terminal connected to the imaging apparatus 100. The control unit 102 controls the imaging unit 101, such as the start/end of imaging, in accordance with commands transmitted from the information processing apparatus 130 or the display apparatus 140.

The communication unit 103 is a communication interface which transmits image data generated by imaging by the imaging unit 101 to the image server 120, the information processing apparatus 130, and the display apparatus 140 via the network 150. The communication unit 103 adjusts data exchange with a communication partner by using, for example, a network file system such as NFS or CIFS, or a network communication protocol such as UDP or TCP. Also, the communication unit 103 receives setting information and commands for controlling the imaging apparatus 100 from the information processing apparatus 130 or the display apparatus 140, and supplies the setting information and commands to the control unit 102. The control unit 102 controls the operation of the imaging apparatus 100 in accordance with the setting information and commands.

The image server 120 records and manages image data generated by the imaging apparatus 100. In accordance with settings and requests from the information processing apparatus 130 or the display apparatus 140, the image server 120 can record and edit the image data and supply the recorded image data to each apparatus. The information processing apparatus 130 analyzes image data obtained by the imaging apparatus 100 or image data provided from the image server 120, and outputs a notification based on the result of analysis. This notification can be output by a display device or sound output device of the information processing apparatus 130, or by the external display apparatus 140.

The display apparatus 140 can display an image obtained by the imaging apparatus 100, and can output a notification received from the information processing apparatus 130. The display apparatus 140 can also provide a user interface for designating the conditions of imaging by the imaging apparatus 100, set the image server, and display a distributed image.

The network 150 is a communication line such as a LAN or the Internet capable of IP-based communication. A communication line having a necessary form is installed as the network 150 in accordance with an application or a purpose, regardless of whether the form is wired or wireless. The imaging apparatus 100 can obtain a live image in accordance with the designated imaging conditions, and distribute the obtained image data to each apparatus across the network 150.

The information processing apparatus 130 can include a storage unit 131, a setting unit 132, an image processing unit 133, a display unit 134, an operation unit 135, and a communication unit 136.

The storage unit 131 stores setting information of a detection target region in which it is necessary to detect the existence of an object and count the detected objects, in a predetermined area as a monitoring target of the imaging apparatus 100. This setting information contains position information (coordinate information) for specifying a detection target region on image data obtained by imaging a monitoring area, and information indicating, for example, a threshold for determining whether to notify the analytical result based on the number of detected objects, and the type of the detection target region. The setting unit 132 performs a setting process of setting the detection target region in the monitoring area. The storage unit 131 stores the setting information set by the setting unit 132.

The image processing unit 133 analyzes image data provided from the imaging apparatus 100 or the image server 120, based on the setting information set by the setting unit 132, and outputs the analytical result. This analyzing process includes, for example, detecting an object (for example, a person) existing in a predetermined region from the image data obtained from the imaging apparatus 100 or the image server 120, and counting the detected objects. The image processing unit 133 can also determine whether the number of objects exceeds a threshold, based on threshold information for each region set by the setting unit 132. If the number of objects exceeds the threshold, the image processing unit 133 can output a notification indicating this information to the display unit 134 or the display apparatus 140. This notification output can also be performed by using a sound or the like, instead of an image.

In addition, the image processing unit 133 can perform control of displaying image data obtained from the imaging apparatus 100 or the image server 120 and various setting screens on the display unit 134, and can store the obtained image data in the storage unit 131. Furthermore, the image processing unit 133 can perform control of sequentially switching image data transmitted from a plurality of imaging apparatuses 100 or a plurality of image servers 120 at a predetermined interval. In this control, the image processing unit 133 can decode compressed image data in order to perform image analysis. The image processing unit 133 can also control the image obtaining timing in synchronism with the detection timing.

The display unit 134 can display image data obtained from the imaging apparatus 100 or the image server 120, and can also display a setting screen for setting the setting information, and a screen for notification output. The operation unit 135 can accept operations from the operator of the information processing apparatus 130. More specifically, the operation unit 135 can accept an operation for changing the setting of the imaging apparatus 100 or the information processing apparatus 130, and can include a keyboard, a mouse, various operation buttons, a touch panel, and the like. When a plurality of imaging apparatuses 100 or a plurality of image servers 120 are connected to the network 150, the operation unit 135 can input instructions to cause the display unit 134 to display image data of the plurality of apparatuses or servers on one screen. The operation unit 135 can also input instructions to select one image data on the screen and display the selected image data on the display unit 134.

The communication unit 136 receives image data transmitted from the imaging apparatus 100 or the image server 120. The communication unit 136 can also transmit setting information, control information, and a distribution command set by the user of the information processing apparatus 130 by using the display unit 134 or the operation unit 135, to the imaging apparatus 100. In addition, the communication unit 136 can output the result (including the abovementioned notification) of analysis of image data performed by the information processing apparatus 130 to the display apparatus 140 connected to the network 150.

In this embodiment, a case using one imaging apparatus 100 will be explained. In the configuration of the monitoring system 10 shown in FIG. 1, however, the number of the imaging apparatuses 100 can be an arbitrary number of one or more, and is not limited. Each of the image server 120, the information processing apparatus 130, and the display apparatus 140 need not be implemented by a single apparatus, and the function of each apparatus can also be implemented by cooperation of a plurality of apparatuses. In addition, FIG. 1 shows the image server 120 and the information processing apparatus 130 as independent components, but the information processing apparatus 130 may also implement the function of the image server 120. Furthermore, the arrangement in which the imaging apparatus 100 and the information processing apparatus 130 are connected across the network 150 has been explained. However, it is also possible to configure these apparatuses as an imaging unit and an image processing unit, and implement these units as one system.

Next, an outline of the arrangement of the information processing apparatus 130 configuring the monitoring system 10 corresponding to this embodiment will be explained. FIG. 2A is a block diagram showing a hardware configuration example of the information processing apparatus 130. The image server 120 and the display apparatus 140 described above may also have the same hardware configuration or an equivalent hardware configuration.

Referring to FIG. 2A, a CPU 200 performs control of executing, for example, an application program, an operating system (OS), a control program stored in a hard disk device (to be referred to as an HD hereinafter) 205, and temporarily storing information necessary to execute the program, files, and the like in a RAM 202. The CPU 200 also executes processing corresponding to this embodiment based on detected person information provided from the imaging apparatus 100 and stored in the RAM 202 and information obtained from the image server 120. Furthermore, the CPU 200 controls data exchange with the external display apparatus 140 via an interface (I/F) 208. Note that processes shown in FIGS. 4 and 6 (to be described later) are also implemented by the CPU 200 by controlling the whole apparatus by executing corresponding processing programs. A ROM 201 stores a basic I/O program, and various kinds of data such as an application program for executing predetermined processing. The RAM 202 temporarily stores various kinds of data, and functions as a main memory, a work area, and the like of the CPU 200. The RAM 202 also temporarily stores information received from the imaging apparatus 100 and the image server 120.

An external storage drive 203 is an external storage drive for implementing access to a recording medium, and can load a program and the like stored in a medium (recording medium) 204 into this computer system. Note that as the medium 204, it is possible to use, for example, a Floppy® disk (FD), a CD-ROM, a CD-R, a CD-RW, a PC card, a DVD, a Blu-ray®, an IC memory card, an MO, or a memory stick.

In this embodiment, an HD (Hard Disk) functioning as a mass memory is used as the external storage device 205. The HD 205 stores application programs, an OS, control programs, related programs, and the like. Note that a nonvolatile storage device such as a Flash® memory may also be used instead of the hard disk.

An instruction input device 206 is, for example, a keyboard, a pointing device (a mouse or the like), or a touch panel. An output device 207 outputs a command input from the instruction input device 206, a response output of the information processing apparatus 130 with respect to the command, or the like. The output device 207 can include a display, a loudspeaker, and a headphone terminal. A system bus 209 manages the flow of data in the information processing apparatus 130.

The interface (to be referred to as the I/F hereinafter) 208 has a role in mediating data exchange with an external device. More specifically, the I/F 208 can include a wireless communication module, and the module can include well-known circuit mechanisms including an antenna system, an RF transmitter/receiver, one or more amplifiers, a tuner, one or more oscillators, a digital signal processor, a CODEC chipset, a subscriber identification module card, and a memory. Furthermore, the I/F 208 can include a wired communication module for wired connection. The wired communication module allows communication with another device via one or more external ports. The I/F 208 can include various software components that process data. The external port is coupled to another device via Ethernet, USB, IEEE1394, or the like directly indirectly across a network. Note that software for implementing the same function as that of each of the above apparatuses can be used in place of the hardware apparatus.

Whenever operating a program for executing processing corresponding to this embodiment, the program can be loaded into the RAM 202 from the HD 205 in which the program is already installed. It is also possible to record the program according to this embodiment in the ROM 201, configure the program so as to form a part of the memory map, and execute the program directly by the CPU 200. Furthermore, the corresponding program and related data can be loaded into the RAM 202 directly from the medium 204 and executed.

Figure 2B:
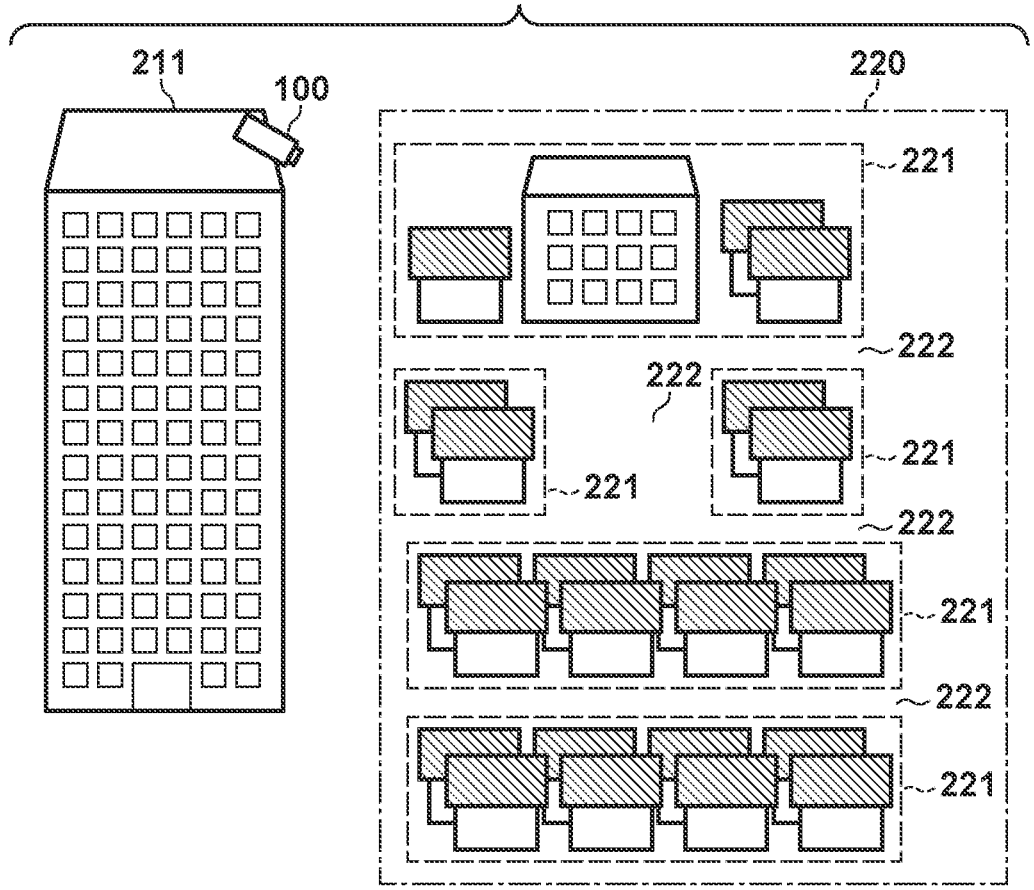
FIG. 2B is a view showing an installation example of the monitoring system 10 corresponding to the exemplary embodiment.

The monitoring system of this embodiment is applicable to a monitoring area (monitoring target zone) as shown in FIG. 2B. The monitoring area can be, for example, an urban area in which a plurality of houses and buildings stand in a row. In this embodiment, an urban area like this is imaged by being overlooked from a high position in order to image a broad range of the area. Accordingly, FIG. 2B shows, as an example, a case in which the imaging apparatus 100 is installed on the rooftop of a high-rise building 211 from which the imaging apparatus 100 can overlook a monitoring area 220. By thus performing imaging by overlooking, the imaging region can contain a broad range of the urban area. In this embodiment, the case in which the imaging apparatus 100 is installed on the high-rise building will be explained. However, the installation position is not limited to the high-rise building as long as the position is a high place and capable of imaging the urban area by overlooking it. Examples are a hill and a mountain. When imaging is performed from a place higher than at least some buildings installed in the monitoring area 220, it is possible to efficiently count persons near the buildings.

To secure the resolution when imaging a wide range by overlooking it as described above, a super-high-resolution (multi-pixel) network camera including an imaging element capable of performing imaging by 20 megapixels (5,472 horizontal pixels and 3,648 vertical pixels) can be used as the imaging apparatus 100 of this embodiment. The imaging apparatus 100 can monitor a broad range because the resolution of an image obtained by the imaging apparatus 100 is higher than that of a network camera which is often used as a monitoring camera and includes a Full-HD (1,920 horizontal pixels and 1,080 vertical pixels) imaging element.

In this embodiment, the resolution when imaging the monitoring area is so adjusted as to fall within a predetermined range. First, the viewing angle is so set as to ensure a resolution of 10 pixels per unit length (one meter) (10 pixels/meter) as at least a minimum value for the monitoring area. In addition, in order to image a wider area, the resolution of a second area positioned farthest from the imaging apparatus 100, in the monitoring area within the viewing angle, can be suppressed to, for example, 150 pixels per unit length (one meter) (150 pixels/meter) or less as a maximum value.

Referring to FIG. 2B, the monitoring area 220 of the imaging apparatus 100 can be divided into first areas 221 in which structures such as houses and buildings are installed, and second areas 222 as areas of ground such as streets and squares or parks. Since people can enter the second areas 222, the number of persons can be counted by analyzing image data obtained by imaging these places.

The procedure of a process of setting, in image data obtained from the imaging apparatus 100 or the like, a region (detection target region) for performing object detection in the monitoring area will be explained below with reference to FIGS. 3A to 3D and FIG. 4. First, the position of the imaging apparatus 100 is fixed in this embodiment, so the monitoring area is uniquely set. For example, when imaging an urban area as the monitoring area, an image 300 as shown in FIG. 3A is always obtained. FIG. 3A is a view showing an example of the image 300 obtained by actually imaging an urban area by the abovementioned configuration. In the image 300, regions for counting objects (persons) existing in ground regions (outdoors) such as squares or parks and streets are set as detection target regions.

Figure 4:
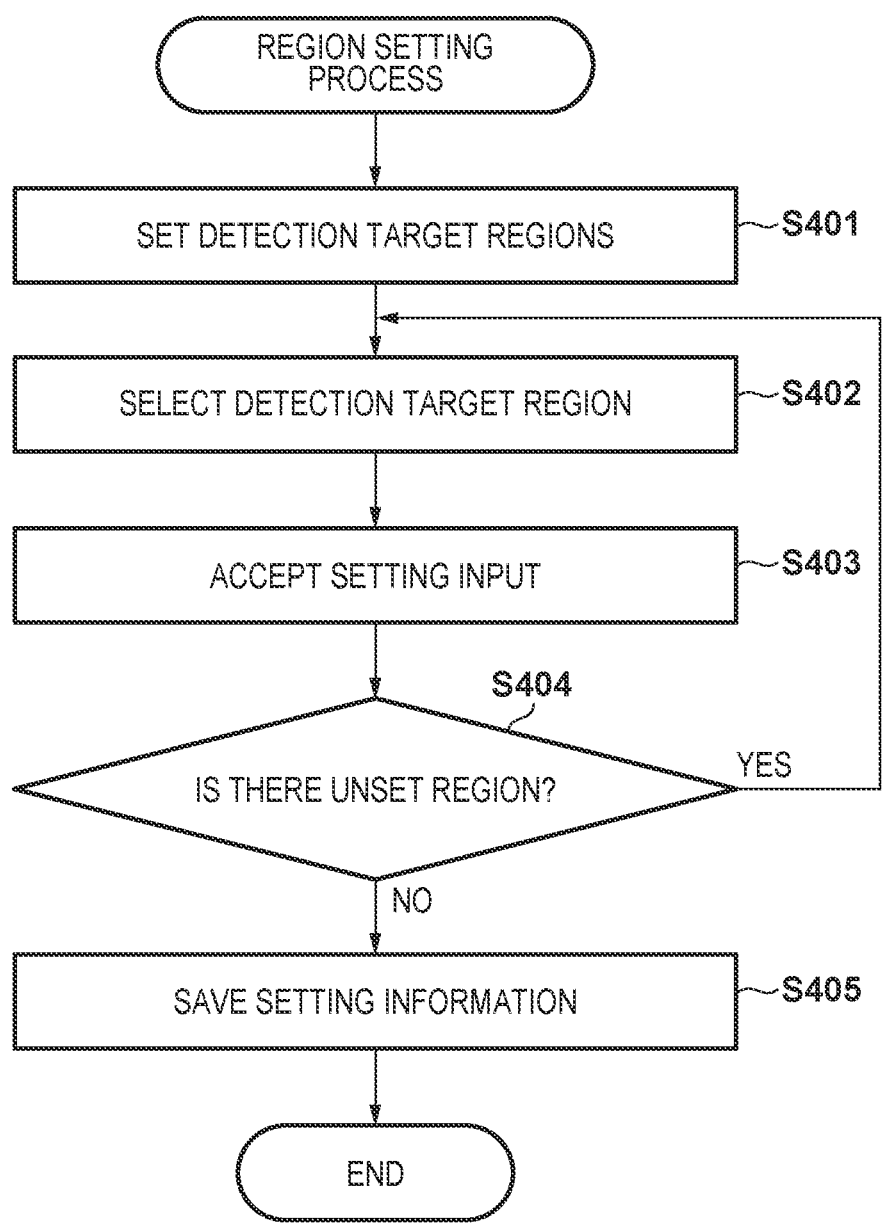
FIG. 4 is a flowchart showing an example of a region setting process corresponding to the exemplary embodiment.

In step S401 of FIG. 4, the setting unit 132 of the information processing apparatus 130, for example, analyzes image data, detects structures such as houses and buildings and ground regions such as squares or parks and streets from the image, and automatically sets detection target regions. Structures, squares or parks, and streets can be detected by using pattern matching, or an AI technology using a trained model having mechanically learned images of structures, squares or parks, and streets. The setting unit 132 sets ground regions corresponding to the squares or parks and the streets as the detection target regions. Also, the setting unit 132 does not include regions corresponding to the structures in the detection target regions. As will be described later, however, among the regions corresponding to the structures, a region of a portion adjacent to the ground region can be included in the detection target regions.

In step S401 of FIG. 4, the setting unit 132 may also set regions corresponding to the squares or parks and the streets as the detection target regions, based on operation input performed by the user of the information processing apparatus 130 by using the operation unit 135. When setting the detection target regions, it is also possible to adopt, for example, a method of forming a polygon by connecting straight lines drawn on image data like drawing with a single stroke of the brush by using a mouse or the like. To make a region settable more accurately, it is also possible to define the region by displaying image data in an enlarged scale as needed. Information for defining the position of each region on image data, for example, information of a polygon need only has coordinate information of the apexes of the polygon. Also, information of a circle can have information of the coordinates of the center and the value of the radius. As the coordinate system of image data, it is possible to adopt an xy coordinate system having the origin in the upper left portion of the figure, the x-axis in the vertical direction, and the y-axis in the horizontal direction. Furthermore, it is also possible to associate information of the latitude and longitude in map information with pixel coordinate information in image data beforehand in the storage unit 131, and allow the user to designate a detection target region on the map displayed on the display unit 134. In this case, the setting unit 132 may also set a detection target region by converting the set region designated on the map into a region on the image data. The setting unit 132 can also correct the set detection target region based on a user operation by analyzing the image data.

In this embodiment as described above, the setting unit 132 can set a region having an arbitrary shape on image data based on a user's instruction, so regions (for example, squares or parks and streets) which the user regards as a group can be preregistered as one group of detection target regions. This prevents an inconvenience in which the system automatically divides an area and the user cannot obtain a result which he or she expects.

As shown in FIG. 3B, set regions 301 are superimposed on image data when the display unit 134 displays the image data, so the user can visually recognize portions of the image data where the detection target regions are set. Information can selectively be input to each detection target region 301 superimposed on the image data as shown in FIG. 3B. If a given region is selected as an information setting target in step S402, the process advances to step S403, and the setting unit 132 accepts setting input to the selected detection target region.

In this embodiment as shown in FIG. 3C, the setting screen displays an information input area 302, and various kinds of information such as the region number, type, and threshold can be input. The region number is an identification number to be uniquely assigned to a detection target region set on the same image data 301. The type is information representing the type of the detection target region. For example, information of the type of actual region such as a street or a square is given. The threshold person count is a threshold as a reference for outputting an alarm. If the number of persons detected in the region exceeds the threshold person count, an alarm is output. This threshold can be adjusted in accordance with the size or type of a region. It is also possible to set a person density in accordance with the type such as a square or a street, and automatically assign a value corresponding to the type. In this case, it is possible to input the area of a region by the user or automatically calculate the area based on the scale or the map, and calculate the number of persons as a threshold from the person density and the area. Furthermore, these values may also be set at different values from one time zone to another.

In the example shown in FIG. 3C, region number 1 is given to a selected detection target region 303, a square is selected as the type, and the threshold person count is 10 or more. If an OK button is pressed, the contents are set in a region 303. On the other hand, if a cancel button is operated, the input contents are reset, and no information is set in the region 303.

The setting unit 132 accepts setting input for the selected target region in step S403, and determines whether an unset region exists in subsequent step S404. If an unset region exists, the setting unit 132 returns to step S402 and continues the process. On the other hand, if no unset region exists, the process advances to step S405, and the setting unit 132 saves the already set setting information in the storage unit 131. In this saving process, the region number, the type, the threshold person count, and the coordinate information for specifying a region on image data are associated with each other for each region, and are saved as setting information in the storage unit 131. If the threshold person count changes from one time zone to another, a value corresponding to each time zone is saved.

The setting information saved in the storage unit 131 can be read out as needed, and the contents of the information can be edited. For example, as shown in FIG. 3D, the region number, the type, and the threshold person count set for each region can be confirmed and edited by accepting selection by using a display switching input area 304. FIG. 3D shows a case in which the threshold person count is displayed. The user can display information by selecting a button of "region number", "type", or "threshold person count", and directly change the numerical value set for each region. The user can save the changed contents by clicking a save button. If the user does not change the contents, he or she need only click a cancel button.

Figure 5A:
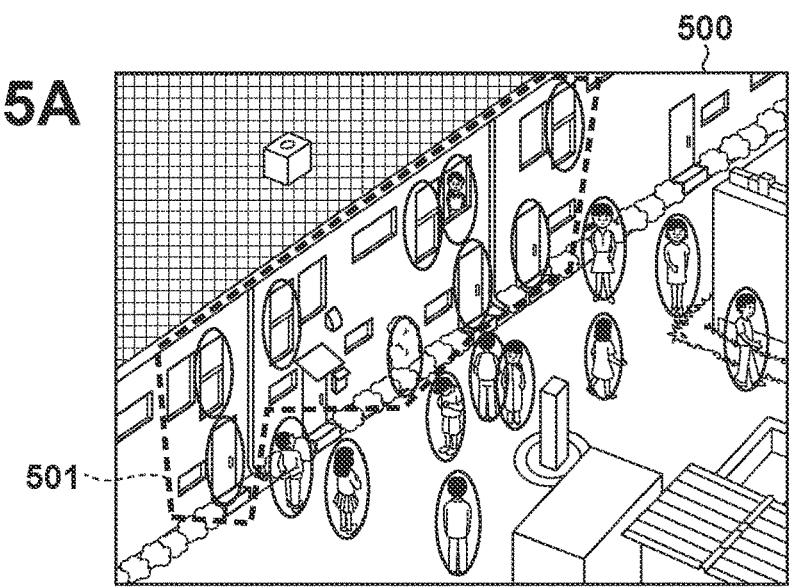
FIG. 5A is a view showing an example of a detection target region setting method corresponding to the exemplary embodiment.
Figure 5B:
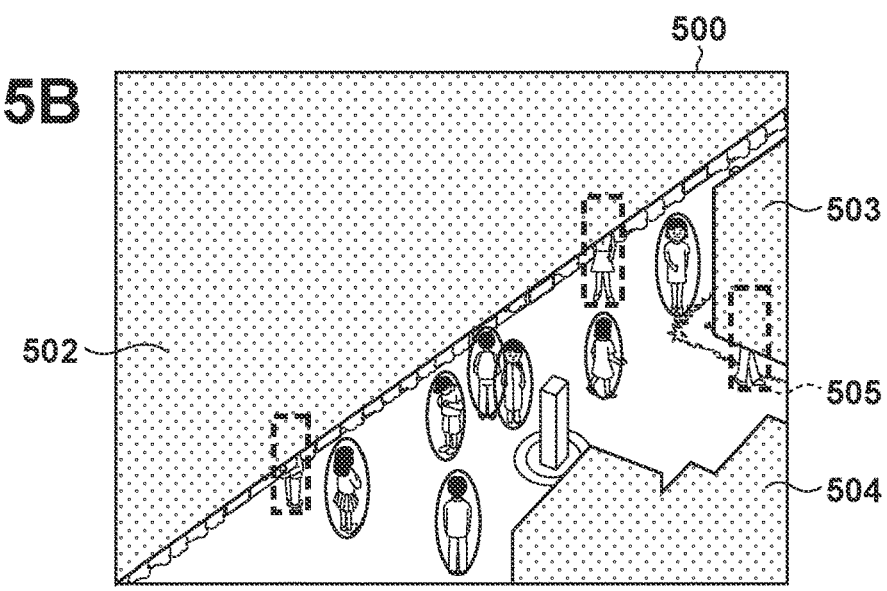
FIG. 5B is a view showing another example of the detection target region setting method corresponding to the exemplary embodiment.

Details of the process of setting the detection target region in step S401 will be explained below with reference to FIGS. 5A to 5C. First, a case in which a detection target region is set in an enlarged image 500 as shown in FIG. 5A will be described as an example. In the image 500, a street extends before structures, a plurality of pedestrians exist on the street, and a person also exists in the structure. Referring to FIG. 5A, objects which may be detected as persons are enclosed within circles. These objects include an object existing in a region enclosed within a dotted line 501. FIG. 5B shows an image when the street is set as a detection target region and the structures are excluded from the detection target region. FIG. 5B shows regions (detection excluded regions) excluded from the detection target region by shaded regions 502, 503, and 504. Accordingly, a region other than the shaded regions is the detection target region.

When detecting persons after excluding the structure regions from the detection target region, regions containing the structures in the image are excluded from the target of the analyzing process, so the processing load can be reduced. On the other hand, a person indicated by a dotted-line frame 505, who is positioned near the boundary between the detection target region and the detection excluded region, may not appropriately be detected as a person, and this causes a detection omission.

Figure 5C:
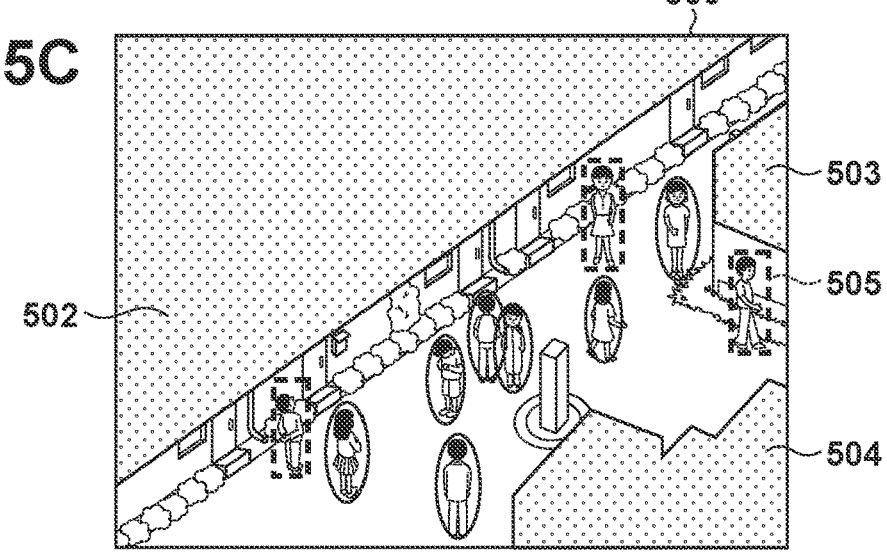
FIG. 5C is a view showing still another example of the detection target region setting method corresponding to the exemplary embodiment.

As shown in FIG. 5C, therefore, the detection target region is extended from the street to the structure so that the person on the street can be detected, that is, the detection target region is so adjusted as to include at least a part of the structure. Consequently, the detection excluded regions 502 and 503 indicated by the shaded regions reduce, and the person near the boundary, who is indicated by the dotted-line frame 504, becomes detectable.

Figure 6:
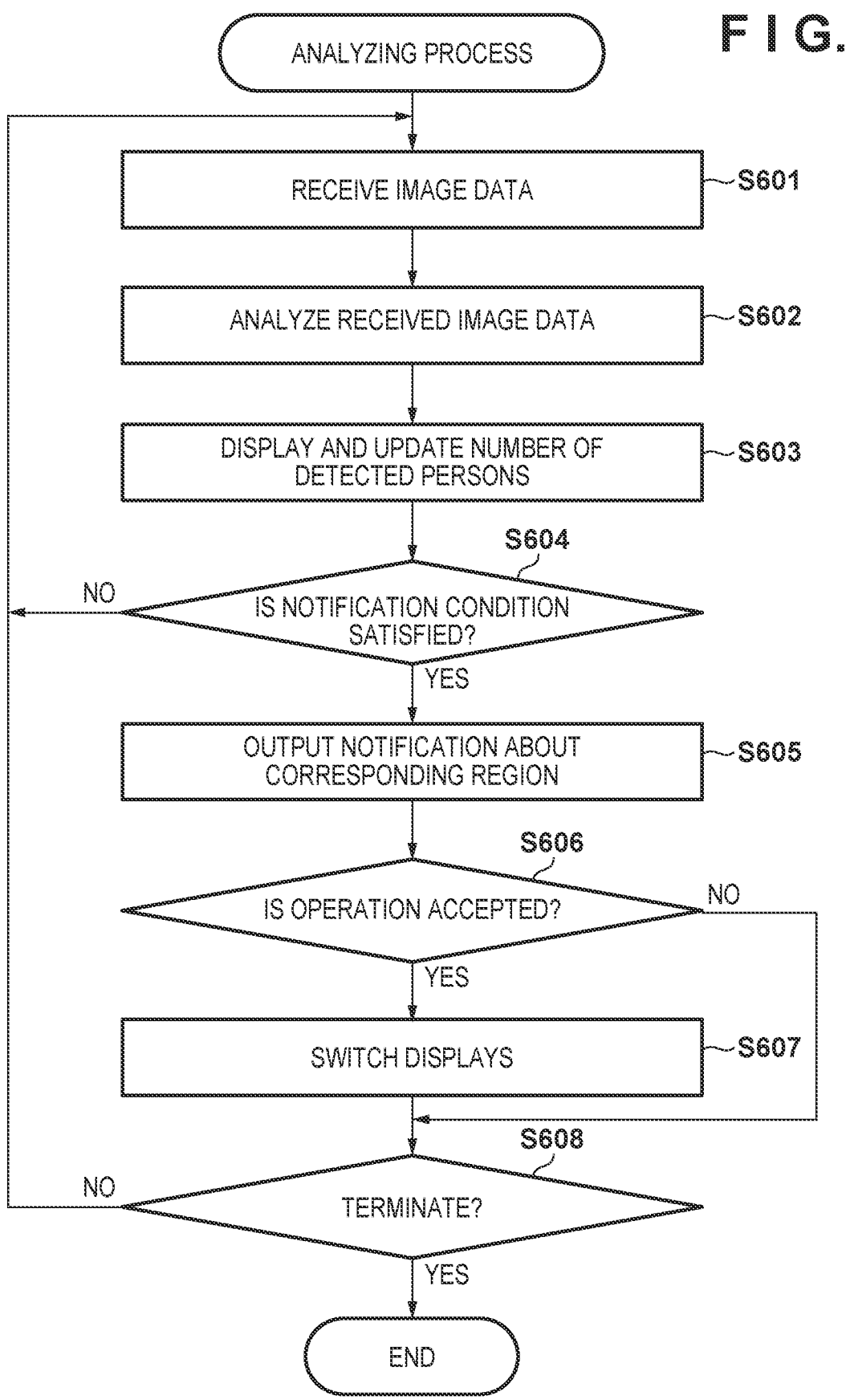
FIG. 6 is a flowchart showing an example of an analyzing process corresponding to the exemplary embodiment.

Details of the analyzing process to be performed on image data actually obtained by imaging after the setting unit 132 sets the detection target region in the imaging area as described above will be explained below with reference to a flowchart shown in FIG. 6. FIG. 6 is a flowchart showing an example of the analyzing process corresponding to the exemplary embodiment.

First, in step S601, the information processing apparatus 130 receives image data as a processing target from the imaging apparatus 100 or the image server 120 via the communication unit 136. In subsequent step S602, the information processing apparatus 130 performs the process of analyzing the received image data. More specifically, the setting unit 132 first sets detection target regions on the received image data in accordance with the setting information saved in the storage unit 131. Alternatively, the image processing unit 133 may read out the setting information saved in the storage unit 131, and set detection target regions. Then, the image processing unit 133 performs the analyzing process on each detection target region set on the image data, thereby detecting persons as objects existing in the detection target regions, and counting the detected persons. A person can be detected by using pattern matching, and can also be detected based on the size of an object detected by the background difference. The person detection method may also be performed based on color information.

Figure 7A:
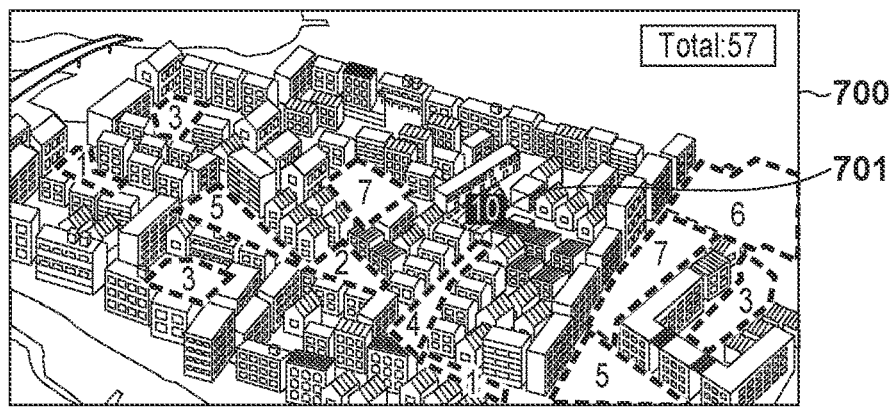
FIG. 7A is a view showing a display example of displaying detection target regions, the number of persons detected in each region, and the total number of detected persons on an image, corresponding to the exemplary embodiment.

In subsequent step S603, the image processing unit 133 controls the display unit 134 to superimpose the number of persons per region, which is counted in step S602, on the image data to be analyzed. In step S604, the image processing unit 133 determines whether the number of detected persons is equal to or larger than the threshold set for each region (whether the notification condition is satisfied). If a region satisfying the notification condition exists ("YES" in step S604), the process advances to step S605. If no such region exists, the process returns to step S601. In step S605, the image processing apparatus 133 controls the display unit 134 to perform notification output for notifying the user of the existence of the corresponding region. FIG. 7A shows an example of the display.

In FIG. 7A, detection target regions are displayed on image data 700 provided from the imaging apparatus 100, and the number of persons detected in each region and the total number of detected persons are also displayed. In addition, the color of a region 701 in which the number of detected persons is equal to or larger than the threshold is changed to notify the user that persons equal to or more than the threshold are detected in that region. The form of the notification output is not limited to the change in color, and the notification may also be performed by using blinking of a region or a character, sound output, or the like.

In this embodiment, an operation from the user can be accepted via the operation unit 135 in the display form as shown in FIG. 7A. In step S606, the image processing unit 133 determines whether an operation from the user is accepted. If the operation is accepted ("YES" in step S606), the process advances to step S607. On the other hand, if no operation is accepted, the process advances to step S608. After that, if this process is to be terminated ("YES" in step S608), this process is terminated. On the other hand, if this process is not to be terminated ("NO" in step S608), the process returns to step S601.

Figure 7B:
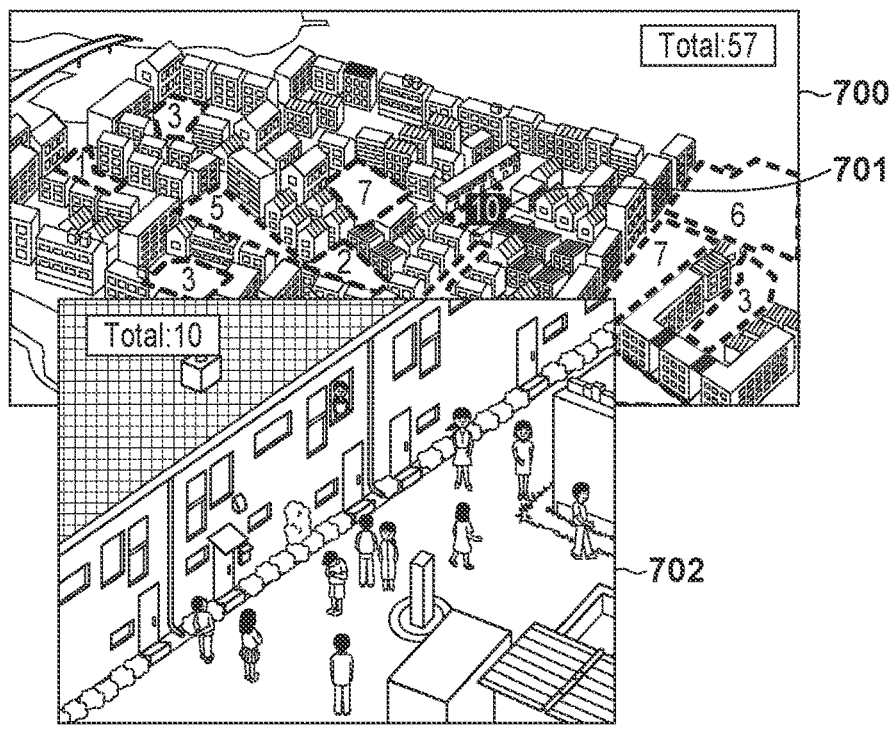
FIG. 7B is a view showing a display example of superimposing an enlarged image on the image, corresponding to the exemplary embodiment.

In this embodiment, if the operation of selecting a region equal to or larger than the threshold is accepted in step S606, the image processing unit 133 can display an enlarged image of the region by superimposing it on the screen by controlling the display unit 134 in step S607. FIG. 7B shows an example of the display. In FIG. 7B, if the region 701 of the image data 700 is selected, an image of the region is displayed on an enlarged screen 702. By referring to the screen 702, the user can observe the actual region where persons equal to or more than the threshold are detected. It is also possible to further enlarge the image displayed on the screen 702, or move the display position upward, downward, leftward, or rightward so as to display an image of the peripheral region.

Also, the image processing unit 133 can automatically display the enlarged screen 702, instead of displaying it in accordance with an operation input from the user. If a plurality of regions are detected, it is possible to simultaneously display enlarged screens of the plurality of regions, or display the enlarged screens in the order of the region numbers.

Furthermore, when the latitude/longitude information in the map information and the coordinate information of the image data are associated with each other and one detection region is selected, the image processing unit 133 may also display the position of the detection region on the map, on the screen for displaying the map information. This makes it possible to intuitively recognize the image indicating the actual state and its geographical position by relating them to each other.

The case in which the notification output of the image analytical result from the information processing apparatus 130 is displayed on the display unit 134 of the information processing apparatus 130 has been explained above, but similar information may also be displayed on the external display apparatus 140 via the communication unit 136. In addition to displaying the image analytical result, the display apparatus 140 may also execute various operations such as a region setting operation and an operation of designating a region to be displayed in an enlarged scale, with respect to the information processing apparatus 130 across the network 150.

In this embodiment, the information processing apparatus 130 can also include the functions of the image server 120 and the display apparatus 140. Also, the imaging apparatus 100 can perform a part of the image analyzing process such as person detection which is performed by the information processing apparatus 130, and transmit detection information such as the position and size to the information processing apparatus 130.

In this embodiment as described above, person detection target regions can be preset when imaging a wide imaging target area by one imaging apparatus 100 while fixing the viewing angle. This makes it possible to monitor the state of a desired region in the relatively wide monitoring area, and efficiently perform, for example, detection of the number of persons.

Second Embodiment

In the first embodiment, an outline of the monitoring system 10 corresponding to the exemplary embodiment has been explained. In this embodiment, various modifications of the first embodiment will be explained.

First, when displaying the enlarged image by superimposing it on the screen in step S607, the enlarged image is directly displayed on the enlarged screen 702 on the display screen as shown in FIG. 7B. This image contains not only images of persons as detected objects, but also windows of houses, laundry, and the like which need not be monitored. Accordingly, it may be determined that privacy protection is insufficient.

Figure 7C:
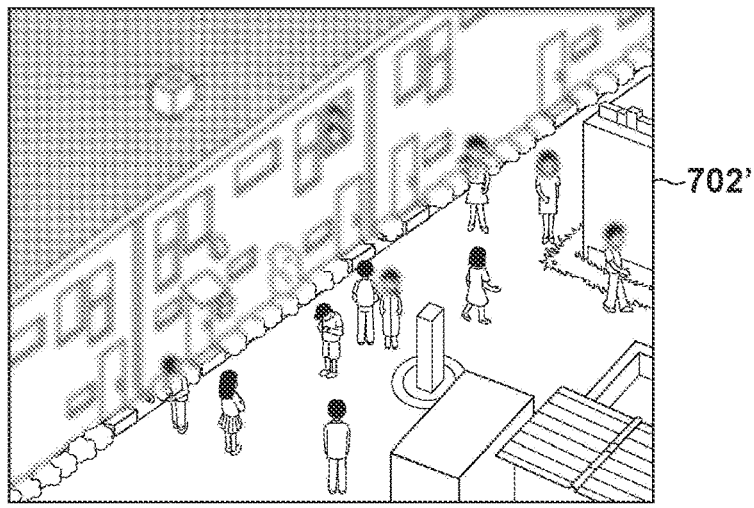
FIG. 7C is a view showing an example of an enlarged image masking process corresponding to the exemplary embodiment.

In this embodiment, therefore, masking can be performed when displaying the enlarged image by superimposing it on the screen in step S607. For example, each object can be masked so that the person cannot be specified, and, if the image contains objects irrelevant to the monitoring target area, these objects can be masked so as not to display them on the enlarged screen, as indicated by an enlarged screen 702' shown in FIG. 7C. This masking process need only be performed such that the image can be blurred or made semitransparent to such an extent that details of a processing target cannot be discriminated, and need not be performed to such an extent that the type of a processing target itself cannot be discriminated. For example, when a processing target is a person, it is only necessary to blur at least the face to such an extent that the person cannot personally be specified. Mask regions in the enlarged image data can also be set at the same time the detection target regions are set in step S401. For example, an arbitrary one of the shaded regions 502, 503, and 504 can be designated and set as a mask region on the screen as shown in FIG. 5C. In this case, the mask region need not always match the detection target region.

Also, a problem sometimes arises when an area is zoomed to a certain degree, although there is almost no problem when displaying the whole area. Therefore, it is possible to set a zoom threshold, and mask detected persons and structures when they are zoomed to a certain degree. As the zoom threshold, a value representing the magnification of each region can be set. However, it is also possible to mask a detected object if the size of the object becomes equal to or larger than a predetermined value. A mask of a structure region can be either opaque or semitransparent. A semitransparent mask is presumably favorable to the user as an observer because he or she can roughly understand the surrounding conditions.

Note that it is also possible to give authority to a specific user (for example, a manager), and allow this managing user to confirm the contents by removing masks when he or she operates the system. In this case, the masks can be removed from only the displayed image. When the image displayed on the enlarged screen 702 is recordable, recording is stopped if the masks are removed, or recording image data is generated independently of display image data so as to keep the masks unremoved.

In this embodiment as described above, if an image is displayed in an enlarged scale when the user confirms a notification region, it is possible to effectively prevent an object irrelevant to the monitoring target area from being displayed.

Third Embodiment

In the abovementioned first and second embodiments, a method of directly setting a detection target region on image data as shown in FIG. 3B has been explained as the detection target region setting method. However, the setting method is not limited to this. For example, it is also possible to extract a region where a structure is arranged on image data, and sequentially set regions other than this extracted region as detection target regions. When extracting the region where the structure is arranged, it is possible to associate the latitude/longitude information in the map information with the pixel coordinate information in the image data beforehand, and designate the structure arrangement region on the map, thereby specifying a region corresponding to the arrangement region in the image data and extracting the region. In this case, in accordance with the association between the map information and the image data, if persons equal to or more than a threshold are detected in a given detection target region set on the image data, notification of the region can be performed on the screen displaying the map information.

Figure 8A:
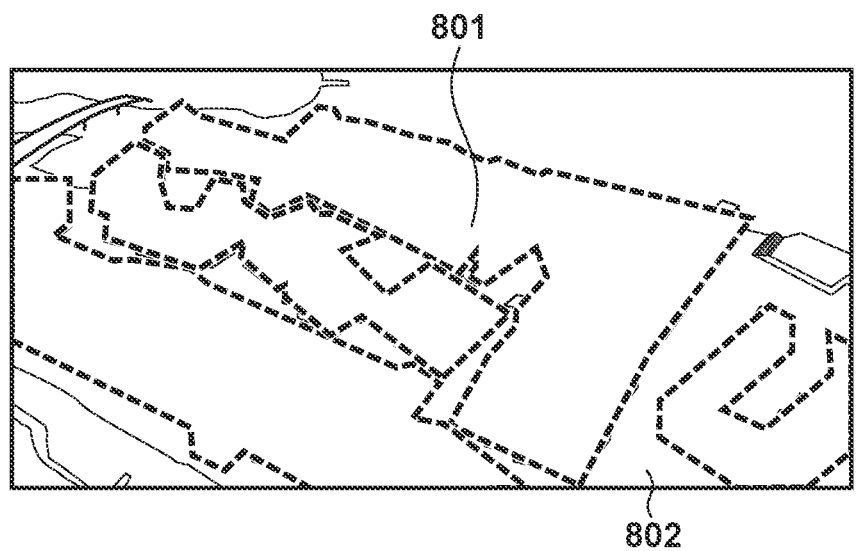
FIG. 8A is a view for explaining another example of the region setting process corresponding to the exemplary embodiment.

This process will be explained with reference to FIGS. 8A and 8B. First, when processing the image as shown in FIG. 3A, regions where structures are arranged are set as a continuous region. FIG. 8A shows the regions where the structures are arranged as regions 801 enclosed within dotted lines. In this case, a white region 802 other than the regions 801 is a region where persons can exist. Then, detection target regions can be decided by freely dividing the region 802.

Figure 8B:
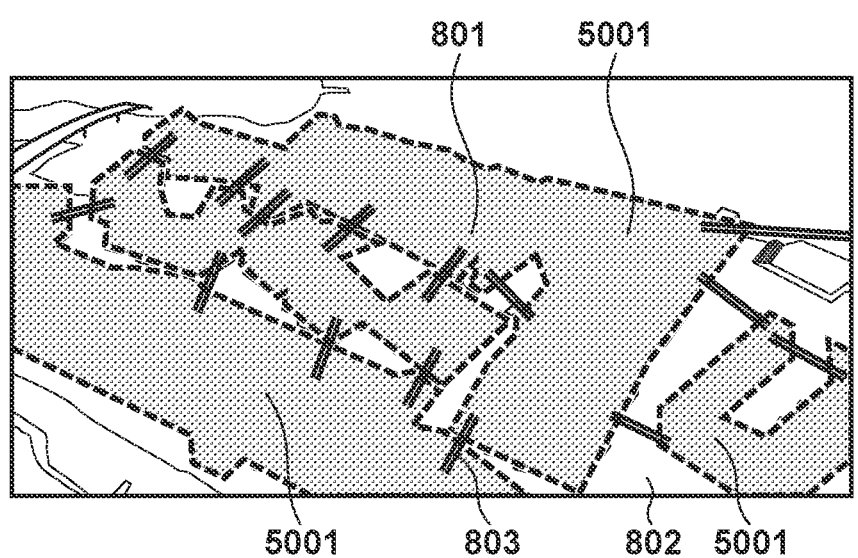
FIG. 8B is a view for explaining another example of the region setting process corresponding to the exemplary embodiment.

FIG. 8B is a view showing an example of setting detection target regions by dividing the region 802 by markers 803. As shown in FIG. 8B, the region 802 can be divided into individual regions. The region dividing method is, for example, a method by which the user designates the input positions of the markers 803. It is also possible to divide the region 802 into individual regions having arbitrary sizes by using a well-known predetermined method. In this case, it is possible to allow the user to perform editing processes such as a process of changing the size of a divided region, and a process of integrating adjacent regions.

In this embodiment, even when setting detection target regions based on the map information, regions which the user regards as an integrated area can be registered as one area by reflecting the user's intention.

Fourth Embodiment

In the first to third embodiments explained above, image data obtained in the state in which the viewing angle of the imaging apparatus 100 is fixed is a processing target. By contrast, in this embodiment, a case in which the invention is applicable to an imaging apparatus having an imaging resolution lower than that of the imaging apparatus assumed in the first to third embodiments by making panning, tilting, and zooming of the imaging apparatus 100 adjustable will be explained.

Figure 9:
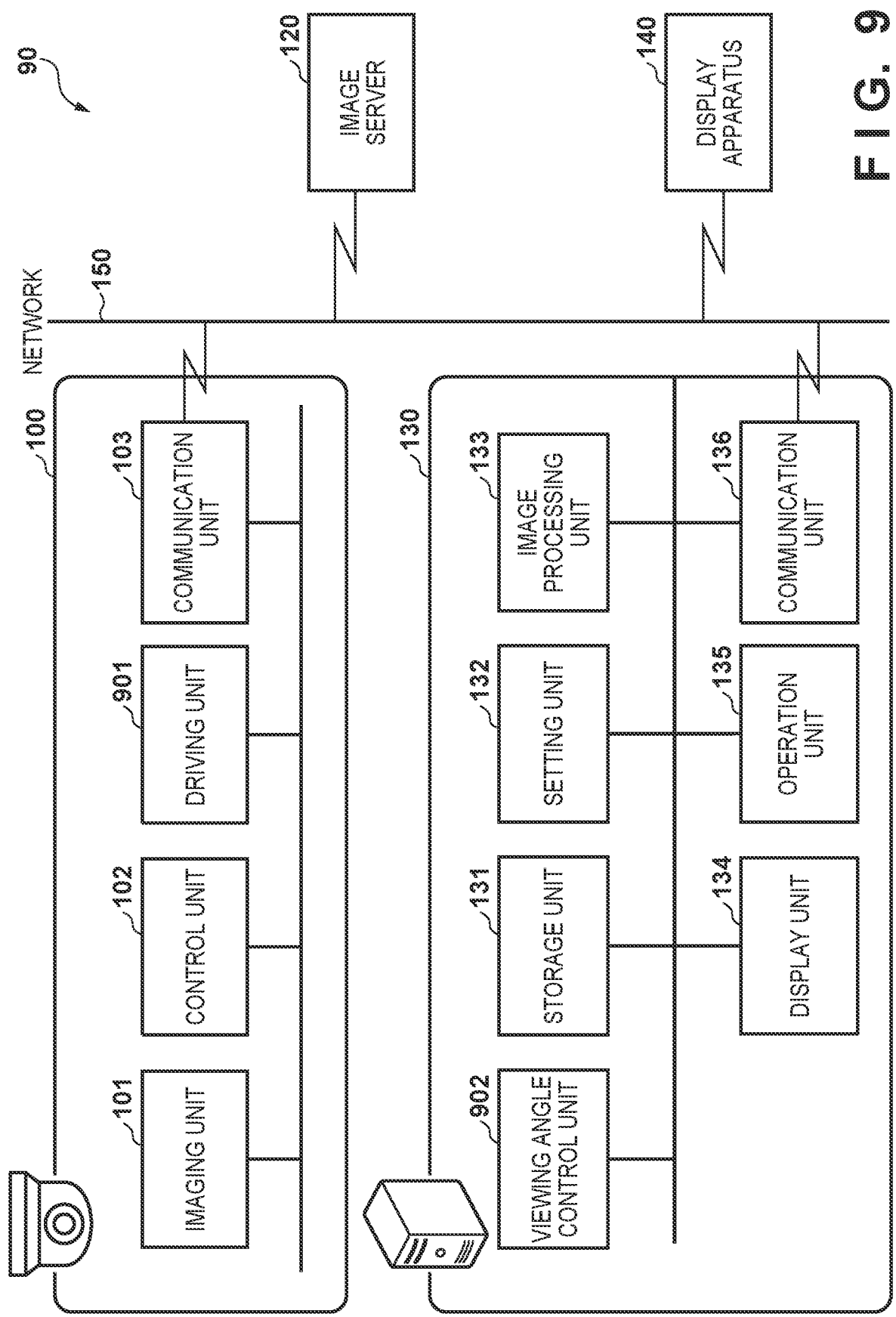
FIG. 9 is a view showing a configuration example of a monitoring system 90 corresponding to an exemplary embodiment.

FIG. 9 is a view showing a configuration example of a monitoring system corresponding to this embodiment. The configuration of a monitoring system 90 shown in FIG. 9 is almost the same as that shown in FIG. 1, except that a driving unit 901 is added to an imaging apparatus 100 and a viewing angle control unit 902 is added to an information processing apparatus.

The driving unit 901 is a mechanism for adjusting panning and tilting of the imaging apparatus 100. In this embodiment, the viewing angle control unit 902 can adjust panning, tilting, and zooming of the imaging apparatus 100 by controlling optical systems of the driving unit 901 and an imaging unit 101 via a communication unit 136 and a communication unit 103. Consequently, the imaging apparatus 100 can generate image data by sequentially imaging necessary regions of an urban area as a monitoring target. The imaging apparatus 100 can be installed in a high place so as to image the monitoring target area by overlooking it in the same manner as shown in FIG. 2B, in this embodiment as well. Assuming that the imaging apparatus 100 has the resolution of Full HD (1,920 horizontal pixels and 1,080 vertical pixels) in this embodiment, the resolution decreases and the person detection accuracy cannot be held constant when using the same viewing angle as that of the imaging apparatus capable of imaging by using 20 megapixels (5,472 horizontal pixels and 3,648 vertical pixels), which is used in the first to third embodiments.

In this embodiment, therefore, the viewing angle control unit 902 controls parameters of panning, tilting, and zooming, so as to secure a resolution of 10 pixels/meter as the imaging condition in the same manner as in the first embodiment. Even when only a part of the image shown in FIG. 3A can be obtained by performing imaging once, imaging need only be performed by turning the imaging apparatus while adjusting panning, tilting, and zooming, so as to image the whole monitoring target area. A panorama image equal to that shown in FIG. 3A can be generated by combining image data obtained by the individual imaging operations. By applying the first to third embodiments to the panorama image obtained as described above, the number of persons can be detected in an arbitrary detection target region in the monitoring target area.

Also, in the first to third embodiments, the imaging apparatus 100 having a fixed viewing angle images the whole monitoring target area. Therefore, the obtained image data contains an image other than the detection target regions. In this embodiment, however, only the detection target regions can be imaged by controlling panning, tilting, and zooming. In this case, the whole monitoring target area cannot be checked by a panorama image, but at least the detection target regions can be checked in the same manner as in the first to third embodiments.

When additionally making the entire monitoring target area checkable, a part or the whole of the monitoring target area is imaged with a resolution lower than 150 pixels/meter, and image data obtained by imaging the detection target regions with a resolution equal to or higher than 150 pixels/meter is superimposed. This makes it possible to grasp the whole monitoring target area even with a low resolution, and check the states of the detection target regions as objects with a high resolution at the same time.

In this embodiment as described above, even when an imaging apparatus capable of imaging with a desired resolution cannot be prepared, the imaging conditions can be adjusted in accordance with the resolution of a usable imaging apparatus. This makes it possible to monitor the state of a desired region in a monitoring target area, for example, detect the number of persons.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-062266 filed on Mar. 28, 2018 which is hereby incorporated by reference herein in its entirety.

What is claimed is:
1. A monitoring system comprising a computer executing instructions that, when executed by the computer, cause the computer to function as:
  an imaging unit capable of being installed in a position from which a plurality of structures can be imaged and which is higher than at least one of the plurality of structures, and configured to generate an image by imaging a monitoring area including the plurality of structures and a ground adjacent to the plurality of structures;
  a setting unit configured to set a plurality of detection target regions, wherein the plurality of detection target regions include at least the ground in the image and partial region of the structure which is adjacent to the ground in the image, and the plurality of detection target regions do not include the structure other than the partial region of the structure; and
  a processing unit configured to count persons existing in each detection target region in the image.

2. The system according to claim 1, wherein the instructions, when executed by the computer, further causes the computer to function as an output unit configured to output a notification in a case where the number of persons counted in the detection target region exceeds a threshold set for the detection target region.

3. The system according to claim 2, wherein the notification includes an enlarged image obtained by enlarging an image of the detection target region in the image.

4. The system according to claim 1, wherein the setting unit sets the detection target region based on designation of the ground in the image, which is accepted by using an image obtained by imaging the monitoring area.

5. The system according to claim 1, wherein the setting unit sets the detection target region by extracting a region corresponding to the structure from an image obtained by imaging the monitoring area.

6. The system according to claim 1, wherein the setting unit sets the detection target region by specifying a position of the structure and a position of the ground on a map of the monitoring area, and converting the positions specified on the map into positions on an image obtained by imaging the monitoring area.

7. A monitoring system comprising a computer executing instructions that, when executed by the computer, cause the computer to function as:
  an imaging unit capable of being installed in a position from which a plurality of structures can be imaged and which is higher than at least one of the plurality of structures, and configured to generate an image by imaging a monitoring area including the plurality of structures and a ground adjacent to the plurality of structures;
  a setting unit configured to set a plurality of detection target regions, wherein the plurality of detection target regions include at least the ground in the image and a partial region of the structure which is adjacent to the ground in the image;
  a processing unit configured to count persons existing in each detection target region in the image;
  an output unit configured to output a notification in a case where the number of persons counted in the detection target region exceeds a threshold set for the detection target region, wherein the notification including an enlarged image obtained by enlarging an image of the detection target region in the image; and
  a masking unit configured to perform a masking process on at least one of a person included in the enlarged image and at least a partial region of a structure included in the enlarged image, in a case where a magnification of the enlarged image exceeds a predetermined value or a size of the person displayed in the enlarged image exceeds a predetermined size.

8. A monitoring system comprising a computer executing instructions that, when executed by the computer, cause the computer to function as:
  an imaging unit capable of being installed in a position from which a plurality of structures can be imaged and which is higher than at least one of the plurality of structures, and configured to generate an image by imaging a monitoring area including the plurality of structures and a ground adjacent to the plurality of structures;
  a setting unit configured to set a plurality of detection target regions, wherein the plurality of detection target regions include at least the ground in the image and a partial region of the structure which is adjacent to the ground in the image; and a processing unit configured to count persons existing in each detection target region in the image, wherein an imaging region of the imaging unit is fixed for counting the persons existing in each detection target region in the image, and the imaging unit performs imaging such that the imaging region includes a whole of the monitoring area, and wherein the imaging unit is set such that the number of pixels of a predetermined length in the monitoring area falls within a predetermined range.

9. The system according to claim 8, wherein the predetermined length is one meter, and the predetermined range is a range of 10 to 150 pixels.

10. A monitoring system comprising a computer executing instructions that, when executed by the computer, cause the computer to function as:

an imaging unit capable of being installed in a position from which a plurality of structures can be imaged and which is higher than at least one of the plurality of structures, and configured to generate an image by imaging a monitoring area including the plurality of structures and a ground adjacent to the plurality of structures;

a setting unit configured to set a plurality of detection target regions, wherein the plurality of detection target regions include at least the ground in the image and a partial region of the structure which is adjacent to the ground in the image; and a processing unit configured to count persons existing in each detection target region in the image, wherein the imaging unit generates a plurality of images of different imaging regions, each of which is generated by imaging at least a portion of the monitoring area by controlling at least one of panning, tilting, and zooming, and the plurality of images of different imaging regions correspond to the plurality of detection target regions.

11. A monitoring method using a monitoring system, comprising:

obtaining an image generated by an imaging unit installed in a position from which a plurality of structures can be imaged and which is higher than at least one of the plurality of structures, by imaging a monitoring area including the plurality of structures and a ground adjacent to the plurality of structures;

setting a plurality of detection target regions, wherein the plurality of detection target regions include at least the ground in the image and a partial region of the structure which is adjacent to the ground in the image, and the plurality of detection target regions do not include the structure other than the partial region of the structure; and counting persons existing in each detection target region in the image.

12. The method according to claim 11, further comprising outputting a notification in a case where the number of persons counted in the detection target region exceeds a threshold set for the detection target region.

13. The method according to claim 12, wherein the notification includes an enlarged image obtained by enlarging an image of the detection target region in the image.

14. The method according to claim 11, wherein in the setting the plurality of detection target regions, the detection target region is set based on designation of the ground in the image, which is accepted by using an image obtained by imaging the monitoring area.

15. The method according to claim 11, wherein in the setting the plurality of detection target regions, the detection target region is set by extracting a region corresponding to the structure from an image obtained by imaging the monitoring area.

16. The method according to claim 11, wherein in the setting the plurality of detection target regions, the detection target region is set by specifying a position of the structure and a position of the ground on a map of the monitoring area, and converting the positions specified on the map into positions on an image obtained by imaging the monitoring area.

17. A monitoring method using a monitoring system, comprising:

obtaining an image generated by an imaging unit installed in a position from which a plurality of structures can be imaged and which is higher than at least one of the plurality of structures, by imaging a monitoring area including the plurality of structures and a ground adjacent to the plurality of structures;

setting a plurality of detection target regions, wherein the plurality of detection target regions include at least the ground in the image and a partial region of the structure which is adjacent to the ground in the image;

counting persons existing in each detection target region in the image;

outputting a notification in a case where the number of persons counted in the detection target region exceeds a threshold set for the detection target region, wherein the notification including an enlarged image obtained by enlarging an image of the detection target region in the image; and performing a masking process on at least one of a person included in the enlarged image and at least a partial region of a structure included in the enlarged image, in a case where a magnification of the enlarged image exceeds a predetermined value or a size of the person displayed in the enlarged image exceeds a predetermined size.

18. A monitoring method using a monitoring system, comprising:

obtaining an image generated by an imaging unit installed in a position from which a plurality of structures can be imaged and which is higher than at least one of the plurality of structures, by imaging a monitoring area including the plurality of structures and a ground adjacent to the plurality of structures;

setting a plurality of detection target regions, wherein the plurality of detection target regions include at least the ground in the image and a partial region of the structure which is adjacent to the ground in the image; and counting persons existing in each detection target region in the image, wherein an imaging region of the imaging unit is fixed for counting the persons existing in each detection target region in the image, and the imaging unit performs imaging such that the imaging region includes a whole of the monitoring area, and wherein the imaging unit is set such that the number of pixels of a predetermined length in the monitoring area falls within a predetermined range.

19. The method according to claim 18, wherein the predetermined length is one meter, and the predetermined range is a range of 10 to 150 pixels.

20. A monitoring method using a monitoring system, comprising:
- obtaining an image generated by an imaging unit installed in a position from which a plurality of structures can be imaged and which is higher than at least one of the plurality of structures, by imaging a monitoring area including the plurality of structures and a ground adjacent to the plurality of structures;
- setting a plurality of detection target regions, wherein the plurality of detection target regions include at least the ground in the image and a partial region of the structure which is adjacent to the ground in the image; and
- counting persons existing in each detection target region in the image,
- wherein the imaging unit generates a plurality of images of different imaging regions, each of which is generated by imaging at least a portion of the monitoring area by controlling at least one of panning, tilting, and zooming, and the plurality of images of different imaging regions correspond to of the plurality of detection target regions.

21. A non-transitory computer-readable storage medium storing a program that, when executed by a processor of an information processing apparatus in a monitoring system, causes the processor to perform operations of:
- obtaining an image generated by an imaging unit installed in a position from which a plurality of structures can be imaged and which is higher than at least one of the plurality of structures, by imaging a monitoring area including the plurality of structures and a ground adjacent to the plurality of structures;
- setting a plurality of detection target regions, wherein the plurality of detection target regions includes at least a region of the ground in the image and a partial region of the structure which is adjacent to the ground in the image, and the plurality of detection target regions do not include the structure other than the partial region of the structure; and
- counting persons existing in each detection target region in the image.

* * * * *